Figure 4:
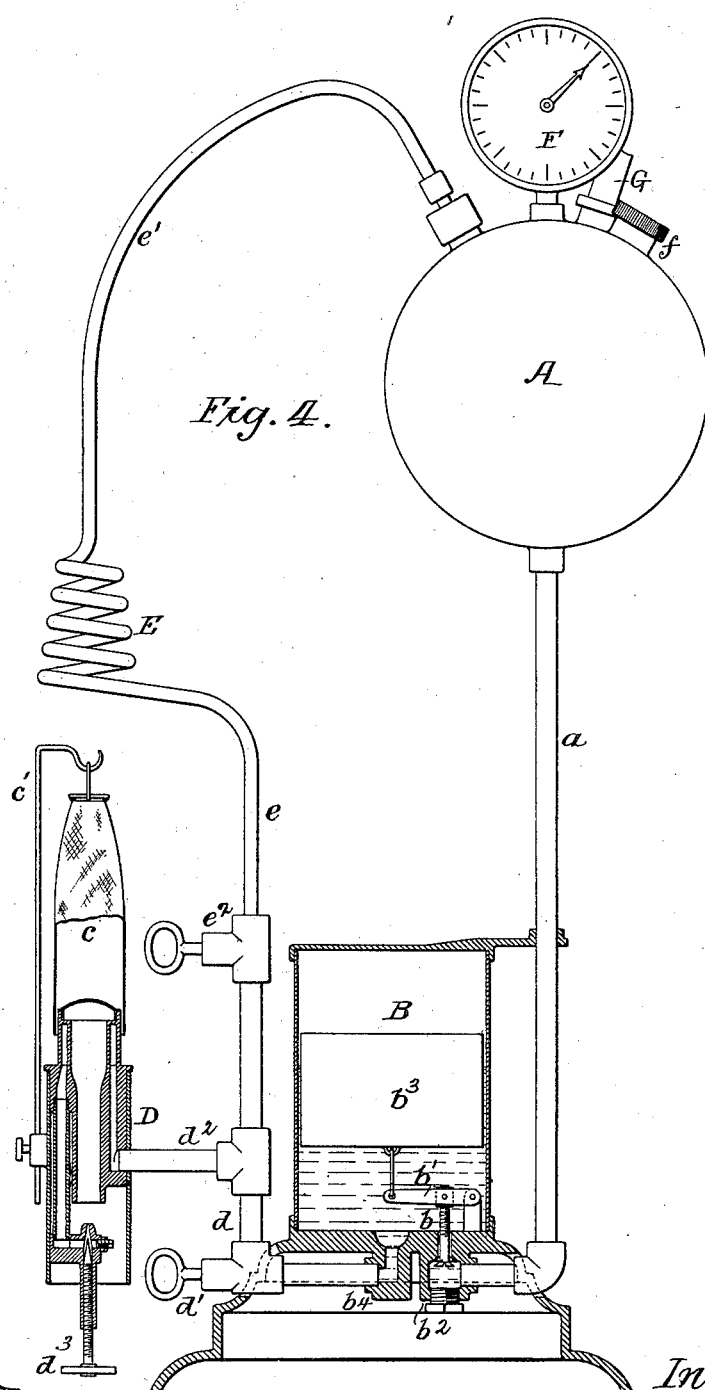

No. 663,814. Patented Dec. 11, 1900.
G. A. LOEBEN.
PRESSURE DEVICE FOR BURNERS.
(Application filed Feb. 4, 1899.)
(No Model.) 3 Sheets—Sheet 1.
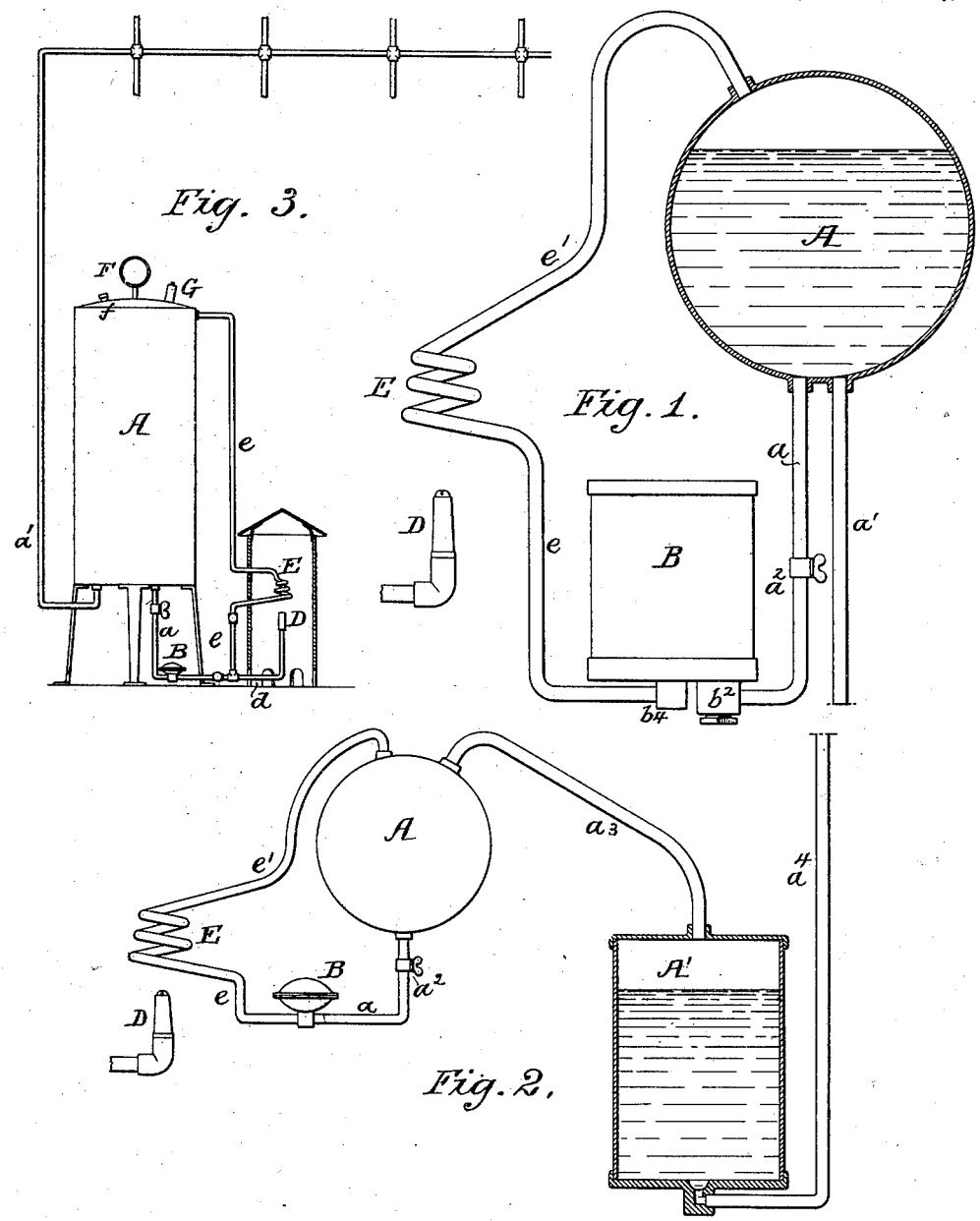
Witnesses
Hamilton D. Turner
Charles DeCou.
Inventor:
Gustave A. Loeben
by his Attorneys
Howson & Howson

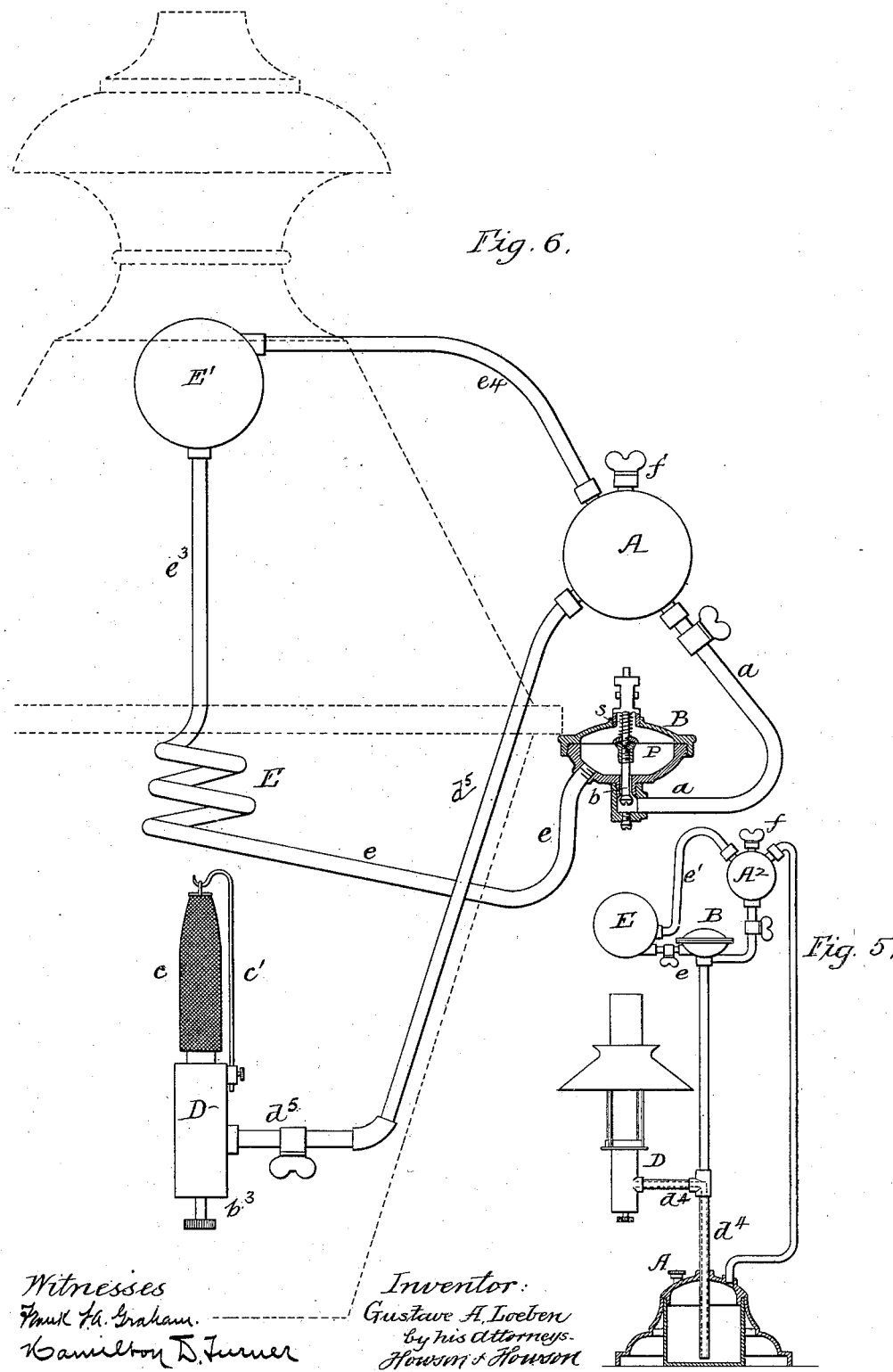

UNITED STATES PATENT OFFICE.

GUSTAVE ADOLPH LOEBEN, OF PHILADELPHIA, PENNSYLVANIA, ASSIGNOR OF ONE-HALF TO ALBERT L. A. TOBOLDT, OF SAME PLACE.

PRESSURE DEVICE FOR BURNERS.

SPECIFICATION forming part of Letters Patent No. 663,814, dated December 11, 1900.

Application filed February 4, 1899. Serial No. 704,550. (No model.)

*To all whom it may concern:*

Be it known that I, GUSTAVE ADOLPH LOEBEN, a subject of the Emperor of Germany, and a resident of Philadelphia, Pennsylvania, have invented certain Improvements in Pressure Devices for Burners, &c., of which the following is a specification.

The object of my invention is to secure and maintain a constant pressure upon fluid in a reservoir. This object I attain by producing the pressure through the expansion of fluid by heat and automatically governing the flow of the fluid to the tube or chamber called the "generator," so that an even pressure is maintained.

My invention is especially applicable to the reservoirs of burners which use hydrocarbons or other fluids capable of being gasified.

I have shown in the accompanying drawings the application of my invention to illuminating-lamps; but it will be understood that the invention may be applied to the reservoirs for burners used for heating purposes or to reservoirs containing other liquids in which pressure is desired.

In a companion application filed on the 6th day of November, 1900, Serial No. 35,636, I have claimed the method of operating a burner by vaporizing the hydrocarbon or other suitable volatile liquid by generating a heat by pressure for feeding said burner and automatically controlling the pressure.

In the accompanying drawings, Figure 1 is a view in diagram, illustrating my invention applied to a reservoir. Fig. 2 is a view illustrating my invention connected to a separate container for holding liquids. Fig. 3 is a view illustrating my invention applied to a central supply-tank connected to a number of pipes. Fig. 4 is a view in elevation and partly in section of one form of my improved apparatus applied to a lamp. Fig. 5 is a view of a modification of the apparatus, and Fig. 6 is a view showing the apparatus applied to a street-lamp.

Referring in the first instance to Fig. 1, A is a reservoir or container for liquid capable of being volatilized by heat. E is a generator—in the present instance a coil of tubing—which is subjected to heat in any manner. Thus in Fig. 1 I have shown a burner D for this purpose, which may be of any suitable construction. B is a regulator placed between the reservoir A and the generator for regulating the flow of fluid to the generator from the reservoir a tube $a$ leading from the reservoir to the regulator, and a tube $e$ leading from the regulator to the generator, while a tube $e'$ connects the generator with the upper portion of the reservoir. A delivery-pipe $a'$ may lead from the reservoir to any point at which it is desired to use the liquid under pressure. The regulator B may be of any form. Thus I have shown in detail in Fig. 4 a float-regulator, while a diaphragm-regulator is shown in some of the other figures. A common form of said diaphragm-regulator is shown in detail in Fig. 6, where P indicates the diaphragm carrying valve $b$, similarly located to the said valve, Fig. 4, the liquid-inlet pipe being designated by the letter $a$ and the outlet from the pressure-chamber by $e$, while the usual spring $s$ is shown encircling the diaphragm-rod.

The operation of the device shown in Fig. 1 is as follows: The reservoir is charged with liquid—for instance, some suitable hydrocarbon—and the generator E is heated until the air in the tubes expands to produce pressure upon the liquid in the reservoir. The valve $a^2$ is then opened, allowing the liquid to pass to the regulator B and through the tube $e$ to the generator, wherein it will be volatilized, and the pressure in the reservoir A will gradually increase, and the valve of the regulator will gradually close the passage leading to the generator owing to such increase of pressure. When the pressure reaches the predetermined limit, the valve of the regulator will entirely close the passage and remain in this position until the pressure in the reservoir decreases, when the valve will again open the passage, allowing more fluid to enter the generator. If the outflow from the reservoir is uniform, as in a lamp, Fig. 4, constant uniform pressure will be maintained in the reservoir.

In Fig. 2 I have shown a pipe $a^3$ leading from the top of the reservoir A to a reservoir A', which may contain liquid other than that capable of being volatilized.

In Fig. 4 I have shown a lamp embodying my invention. A is the reservoir, from which extends a pipe $a$, connected to the inlet $b^2$ of the regulator B. This regulator is in the present instance of the float type, having a valve $b$ attached to a lever $b'$, coupled to a float $b^3$. Above the float is an air-chamber. The valve can be adjusted by removing the plug in the bottom of the inlet $b^2$ and turning the valve, which is in the form of a screw. $b^4$ is the outlet, to which is connected a tube $d$, having a valve $d'$. This tube $d$ is connected by a branch $d^2$ with a burner D. This burner in the present instance is so constructed that the liquid in passing through the burner to the outlet will be gasified. The burner has a suitable valve $d^3$ for regulating the flow of gas. Above the burner in the present instance is an incandescent mantle $c$, carried by a support $c'$ of the ordinary type. Coupled to the pipe $d$ is a tube $e$, extending to the generator E. This generator in the present instance is simply a continuation of this tube, coiled in any suitable form directly above the mantle and within the heat zone of the same. The tube is extended in the form of a branch $e'$ and attached to the upper portion of the reservoir A. $e^2$ is a valve to regulate the flow of the liquid through the tube $e$. In this view I have shown a gage F and a safety-valve G attached to the upper portion of the reservoir A, and $f$ is a capped opening through which the reservoir can be charged with liquid. In operating this lamp the reservoir is charged with any suitable ignitible fluid, such as any of the ordinary hydrocarbons, and the space between the valves $d'$, $d^2$, and $e^2$ is heated by a torch, for instance, the valve $d'$ being closed. The liquid in this portion of the tube will be heated and in time gasified, and the gas escaping from the burner can be then ignited, heating the mantle to incandescence, and the liquid flowing into the generator will be at once gasified and pressure developed in the upper portion of the reservoir. In some cases the air in the generator may be heated at first, so that the expanded air will create a certain pressure on the liquid in the reservoir prior to the gasifying of the liquid passing through the pipe $e$. As the pressure in the reservoir increases the float in the regulator will be raised and will reduce the passage leading to the burner and the generator, and when the pressure reaches the point at which the regulator is set the flow of liquid will be entirely cut off, and as the liquid is further gasified the pressure will decrease and the valve will again open, allowing more liquid to pass through the regulator to the burner and generator. In time the regulator will be set, so that a constant pressure is maintained in the reservoir.

In Fig. 3 I have shown an apparatus somewhat similar to the device shown in Fig. 4, with the exception that the construction illustrated in Fig. 3 is intended for a central reservoir coupled to a number of outlets—such, for instance, as in a building using one reservoir for a number of hydrocarbon-burners. In this event a special burner D' is arranged to heat the generator. A diaphragm-regulator is shown in this instance instead of the float-regulator shown in Fig. 4. A pipe $a'$ leads from the reservoir A to the series of branch pipes having any of the ordinary forms of burners attached.

In Fig. 5 I have shown an instance in which the main reservoir A is below the burner and the generator, and in this case an auxiliary reservoir $A^2$ is used, which is connected to the regulator B, and this regulator in turn is connected to the gasifier E. In the present instance this gasifier is in the form of a chamber. A tube $e'$ forms a communication between the generating-chamber and the top of the auxiliary reservoir $A^2$. A pipe leads from the top of the auxiliary reservoir $A^2$ to the top of the main reservoir A, and a tube $d^4$ leads from the bottom of the main reservoir A to the burner.

In Fig. 6 I have shown one form of my device as applied to a street-lamp. In this instance the main reservoir A is at one side of the lamp-casing and has a tube $d^5$ connecting directly with the burner D and a tube $a$ connecting with the regulator B. Extending from this regulator is a tube $e$, connecting with the generator E, which is in the form of a coil, and this generator is connected with a pressure-chamber E' through a pipe $e^3$, and this pressure-chamber is connected in turn to the top of the reservoir A by a pipe $e^4$.

It will be observed from the foregoing description that the fluid in the generator is gasified by the heat from the burner, thus generating a pressure which acts upon the surface of the liquid in the reservoir and through the medium of the regulator automatically controls the pressure for feeding the liquid to the burner.

The generating device at the burner for vaporizing the volatile liquid, which may be termed the "first" generator, has, it will be noted, connections common to itself and the tank, while the generator which may be termed the "second" generator has a tube or passage leading into the tank.

It will be understood that many modifications will readily suggest themselves to those skilled in the art—as, for instance, in heating-furnaces the arrangement of the parts will be different; but the tube leading into the supply-tank and forming in a part of its length the generator must be so placed in reference to some heat-producer as to properly perform its function, and the regulator must be so situated that the pressure will be automatically controlled.

I claim as my invention—

1. In means for securing and maintaining constant pressure, a reservoir for expansible fluid, a generating means for expanding said fluid by heat and a regulator disposed between the reservoir and the generating means and serving to automatically govern the flow of fluid to the latter.

2. The combination of a burner, a reservoir for hydrocarbons or other gasifiable liquids, a pipe leading from a source of supply in the system to the point of consumption, a pipe leading from the bottom of the reservoir to the top thereof, and extending within the heat zone of the burner, and a regulator for regulating the flow of said liquids from the reservoir through this pipe, whereby pressure will be exerted, substantially as described.

3. In a burner, means operated by said burner for vaporizing a hydrocarbon or other suitable volatile liquid for consumption and means for generating, and automatically controlling, a pressure for feeding said burner.

4. In a burner, a reservoir containing hydrocarbon or other suitable volatile liquid, a generator operated by said burner and communicating with said reservoir, means operated by said burner for creating a pressure in said reservoir, and means for automatically controlling said pressure.

5. In a burner, a reservoir adapted to contain hydrocarbon or other suitable volatile liquid, a generator, connections common to said reservoir and said generator, a second generator adapted to receive hydrocarbon from said reservoir, and a connection from said second generator adapted to discharge into said reservoir above the surface of hydrocarbon or other suitable volatile liquid, and means for automatically controlling the flow of hydrocarbon to said second generator.

6. In a burner, a reservoir adapted to contain hydrocarbon or other suitable volatile liquid, a generator, means for conducting hydrocarbon or other suitable volatile liquid from said reservoir to said generator, a second generator, a tube or passage for conducting hydrocarbon or other suitable volatile liquid to said second generator, a tube or passage leading from said second generator into said reservoir and a valve adapted to be operated by the hydrocarbon or other suitable volatile liquid from said reservoir and controlling the flow of the hydrocarbon to said second generator.

7. A burner having a generator for vaporizing hydrocarbon or other volatile liquid for consumption, means operated by said burner for generating a pressure for feeding the same, and means whereby said pressure is automatically controlled.

8. In a burner, a reservoir adapted to contain hydrocarbon or other suitable volatile liquid, a generator, means for conducting hydrocarbon or other suitable volatile liquid to said generator, a second generator, a pipe or passage adapted to conduct hydrocarbon or other suitable volatile liquid to said second generator, a pipe or passage leading from said second generator into said reservoir, a chamber adapted to receive hydrocarbon or other suitable volatile liquid from said reservoir, a diaphragm closing said chamber and a valve connected with said diaphragm, and controlling the passage to the second generator, said diaphragm being operated by the hydrocarbon or other suitable volatile liquid in said chamber.

9. In a burner, a reservoir adapted to contain hydrocarbon or other suitable volatile liquid, a generator, means for conducting hydrocarbon or other suitable volatile liquid to said generator, a second generator, a pipe or tube adapted to conduct hydrocarbon or other suitable volatile liquid to said second generator, a pipe or tube leading from said second generator into said reservoir, a chamber adapted to receive hydrocarbon or other suitable volatile liquid from said reservoir, a diaphragm closing said chamber, a valve connected with said diaphragm, which latter is adapted to be operated by the hydrocarbon or other suitable volatile liquid in said chamber, and means for returning said valve to its original condition, when the pressure in said tank is reduced.

10. The combination of a burner, a reservoir for hydrocarbon or other gasifiable fluids, means establishing communication between the source of supply and the point of consumption, means exterior to said reservoir for establishing communication between the upper and lower portions thereof, and extending within the heat zone of a burner, and a regulator for regulating the flow of the fluid through the said means, whereby pressure will be exerted.

11. The combination of a burner, a reservoir for hydrocarbon or other gasifiable fluids, a connection between the source of supply and the point of consumption, a connection between the upper and lower portions of the reservoir situated to be heated by said burner, and a device for regulating the flow of the fluid through said connection between the upper and lower portions of the burner, whereby pressure is exerted.

In testimony whereof I have signed my name to this specification in the presence of two subscribing witnesses.

GUSTAVE ADOLPH LOEBEN.

Witnesses:
   WILL. A. BARR,
   JOS. H. KLEIN.